United States Patent [19]

Heitmann et al.

[11] 4,220,965
[45] Sep. 2, 1980

[54] MODIFICATION OF T.V. IMAGE PERFORMED USING RAM STORING THE IMAGE CONTENT

[75] Inventors: Jürgen Heitmann, Seeiheim; Hans-Peter Maly, Darmstadt, both of Fed. Rep. of Germany

[73] Assignee: Robert Bosch GmbH, Stuttgart, Fed. Rep. of Germany

[21] Appl. No.: 912,525

[22] Filed: Jun. 5, 1978

[30] Foreign Application Priority Data

Jun. 4, 1977 [DE] Fed. Rep. of Germany ....... 2725362

[51] Int. Cl.² .................... H04N 9/535; H04N 3/22; H04N 5/22
[52] U.S. Cl. ..................................... 358/22; 358/180; 358/183
[58] Field of Search .................. 364/521; 358/22, 160, 358/180–183, 185, 21 R

[56] References Cited

U.S. PATENT DOCUMENTS

| | | | |
|---|---|---|---|
| 4,011,401 | 3/1977 | Presti | 358/160 X |
| 4,063,280 | 12/1977 | Hattori et al. | 358/22 |
| 4,080,626 | 3/1978 | Hurst et al. | 358/22 X |
| 4,101,930 | 7/1978 | Sanders et al. | 358/183 |
| 4,134,128 | 1/1979 | Hurst | 358/22 |
| 4,163,249 | 7/1979 | Michael et al. | 358/21 R |

OTHER PUBLICATIONS

"The Digital Video Effects (DVE) System," Patten: *SMPTE Journal,* Apr. 1978, vol. 87, pp. 214–218.

*Primary Examiner*—John H. Wolff
*Assistant Examiner*—Aristotelis M. Psitos
*Attorney, Agent, or Firm*—Michael J. Striker

[57] ABSTRACT

A complete analog color-T.V. signal is separated into a luminance component and a color component. Each component is digitalized and then written into an RAM sequentially using a first addressing schedule for the write-in. The information is then read-out using a different addressing schedule for the read-out. The thusly read out digitalized components are converted back into analog form and combined to form another complete analog color T.V. signal. This technique makes possible a variety of special effects, including horizontal and/or vertical image compression, the display of a half image and alongside it a mirror-symmetrical version thereof, the storage of four color T.V. images in a manner which is interleaved in both the x and y directions of the memory, and others.

17 Claims, 3 Drawing Figures

MODIFICATION OF T.V. IMAGE PERFORMED USING RAM STORING THE IMAGE CONTENT

BACKGROUND OF THE INVENTION

H. Schönfelder's book "Farbfernsehen 3" ("Color Television 3"), 1968, Justus von Liebig Publications, pp. 40–45, discloses the use of a so-called trick mixer utilized to create various color-T.V.-image special effects. Such trick mixers conventionally comprise a switchover device controlled by train of control pulses. Two of these switchover devices are used in conjunction, each receiving a respective color-T.V. signal, and the signals are combined in schemes dependent upon the schedueling of the pulses in the control pulse train, to form a composite color-T.V. image. The range of usefulness of this technique, and the number of different special effects achievable, is determined by ability to appropriately schedule the pulses of the control pulse train, and is therefore limited.

SUMMARY OF THE INVENTION

It is the general purpose of the present invention to be able to more variously modify color-T.V. signals and accordingly the color-T.V. images which they represent.

At the broadest level of the invention, this is accomplished by separating a complete analog color-T.V. signal into its luminance component and its color component. Each component is then digitalized and sequentially written into a random-access memory, using a first addressing schedule for the write-in. The thusly stored information is then read out using a different addressing schedule for the read-out, after which the digitalized information is converted back into analog form and combined to form a different complete analog color-T.V. signal.

This greatly increases the flexibility with which such color T.V. images can be modified. Also, the use of separate encoding with respect to the color subcarrier in the color-T.V. signal to be processed avoids many possible limitations which could arise during subsequent signal processing and modification.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
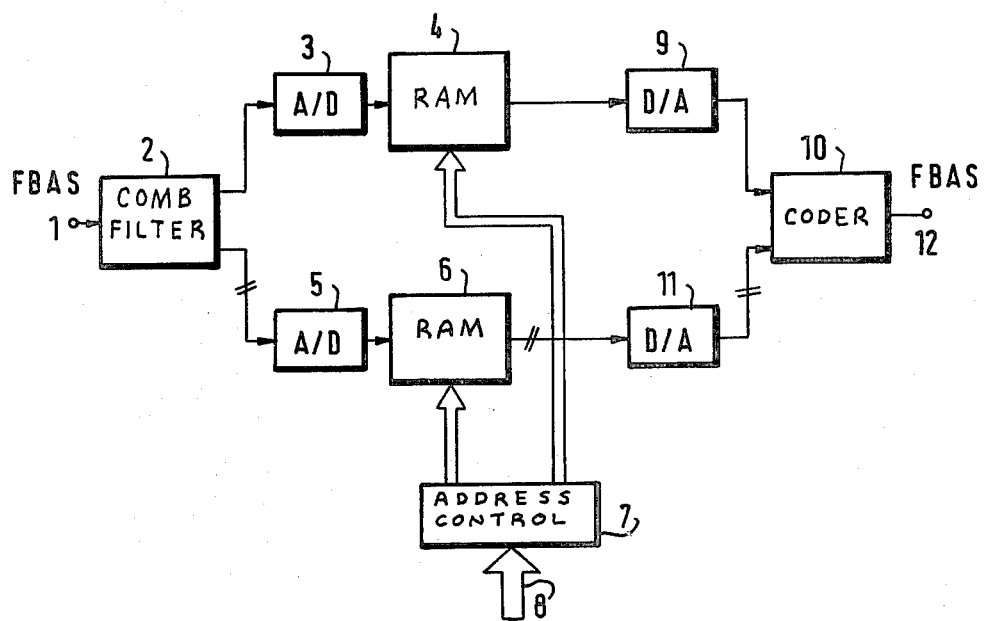
FIG. 1 is an explanatory block diagram illustrating how the inventive technique is performed.

In FIG. 1, terminal 1 receives a complete analog color-T.V. signal FBAS. This signal is applied to a comb filter 2. Comb filter 2 separates the color-T.V. signal FBAS into its color-information and luminance components. The luminance-signal component appearing at the upper output of filter 2 is applied to an analog-to-digtal converter 3, emerges therefrom in digitalized form, and is applied to a random-access memory 4. Likewise, the color-information component appearing at the lower output of filter 2 is applied to an analog-to-digital converter 5, is digitalized and is applied to a random-access memory 6. The random-access memories 4 and 6 are addressed by a control unit 7.

In dependence upon the addressing sequences established by control unit 7, the digitalized luminance information and digitalized color information signals are written into the respective random-access memories 4 and 6, on a pointwise basis, i.e., in correspondence to sequential points of the image represented by the complete signal FBAS. The read-out of memories 4, 6 is likewise performed by the control unit 7. However, in accordance with the present invention, the addressing sequence which the control unit applies to the memories 4, 6 for read-out of stored information can be altered, relative to the addressing sequence which it has used for write-in of this information. Control unit 7 receives, at 8, command information, informing it of what address sequences to use for the write-in and read-out of the memories 4, 6. The digitalized luminance information read out from memory 4 is converted back to analog form by a digital-to-analog converter 9, and applied to an encoder 10. Likewise, the digitalized color information read out from memory 6 is converted back to analog form by a digital-to-analog converter 11 and applied to encoder 10.

The video-frequency luminance signal component and color-information component are, in encoder 10, coded back to again form a corresponding complete analog color-T.V. signal FBAS', meeting the standards of whatever type of color-T.V. system is involved, this complete color-T.V. signal FBAS' being available at output terminal 12.

Of course, a complete analog color-T.V. signal FBAS will include two color-difference signals, hereafter referred to as U and V. Depending upon what standard color-T.V. system is involved, the two color-difference signals U and V are transmitted during each horizontal line interval, i.e., simultaneously, or else are alternately transmitted during alternating respective horizontal line intervals. In the preferred mode of practicing the invention, the color-information signals applied to A/D converter 5 are alternating color-difference-signal sum and difference signals relegated to alternate respective horizontal line intervals, i.e., the color-difference-signal sum U+V in one horizontal line interval, the color-difference-signal difference U-V in the next horizontal line interval, again the color-difference-signal sum U+V in the following horizontal line interval, and so forth, irrespective of whether the color-difference signals U and V themselves are derived from a simultaneous-transmission-type or alternating-transmission-type system signal. However, alternatively, it is also within the scope of the invention to write into RAM 6, for each horizontal line interval, both color difference signals U,V, especially in the case where the starting signal FBAS is of the type wherein the two color-difference signals U,V are transmitted simultaneously in the same horizontal line interval.

Figure 2:
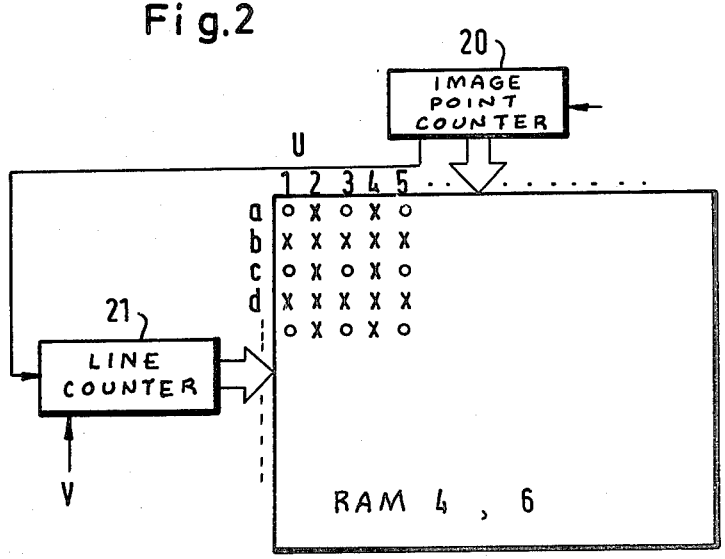
FIG. 2 is an explanatory block diagram illustrating the read-out addressing scheme used for one version of the inventive technique.

FIG. 2 schematically depicts an addressing system, used to address the memories 4 and 6 for certain special-effect applications comprehended by the present invention. As already stated, these memories 4 and 6 are random-access memories: each one of the multitude of storage locations within each such memory is individually addressable, at will, to individually read-out just this storage location, or to individually write into just this storage location, by applying to the address-signal input of the memory an address signal identifying such storage location.

The address signals used to address such individual storage locations within these memories 4, 6 can be generated by means of addressing counters 20 and 21. Addressing counter 20 generates addresses identifying individual columns (1, 2, 3, 4, 5, . . . ) of the memory, whereas addressing counter 21 generates addresses identifying individual lines (a, b, c, d, . . . ) of the memory, i.e., of the rectangular array of storage locations within the memory. The information corresponding to each single line of a T.V. image is here stored within a single respective line of the memory 4 or 6, and the information concerning the successive points of the image line are stored within successive respective storage locations within that single line of the memory. The counting capacity of addressing counter 21, constituting the image-point counter, equals the number of image points into which each image line is to be divided.

When all the image points of one image line have been written into one line of storage locations in memory 4 or 6, a carryover signal U appears at the carryover output of image-point counter 20, and is applied to the input of line counter 21, which counts that carryover pulse, thereby now addressing the next line in the sequence of storage-location lines, into which are then written the successive image points of the next image line. After the whole of a T.V. image has thusly been written into the memory 4 or 6, a vertical-frequency synch signal V resets the line counter 21 back to a state addressing the first memory line a.

To produce a television image which is compressed in the horizontal direction, the signal FBAS for that image is first applied to input terminal 1 and sequentially written into the memories 4 and 6, on the pointwise basis already referred to. Then, for read-out of the thusly stored image, the addressing sequence is altered. In particular, the image-point address schedule is altered, so as not to count columns, 1, 2, 3, 4, 5, etc., but instead every second column, e.g., every odd-numbered column 1, 3, 5, 7, etc., or every even-numbered column 2, 4, 6, 8, etc.

Likewise, if the stored television image is to be compressed in the vertical direction, the line-addressing sequence used for read-out is altered, relative to that used for write-in, so as to count not every successive line a, b, c, d, e, etc., but instead every second line, e.g., every odd-numbered line or every even-numbered line.

If it is desired to compress the stored television image by a factor of two in both the horizontal and the vertical directions, then only every second line of storage locations is read out, and within each such line only every second storage location is read out. This is diagrammatically indicated in the upper left corner of FIG. 2, where the o's indicate those storage locations which are read out and the x's those which are not read out, for a factor-of-2 image compression in both the horizontal and vertical directions.

Mirror-image effects can be implemented by presetting the image-point counter 20 and/or the line counter 21 such that, when they reach respective preset counts, instead of continuing to count upwards, they commence to count downwards from the present counts back to zero. The spatial location, relative to the original image, of the resulting horizontal or vertical mirror-symmetry axis will be determined by the aforementioned count preset on counter 20 or 21.

Although data-storage technology is continually advancing, at least at present certain difficulties can be encountered in actual practice, relative to the write-in and read-out rates needed for memories 4 and 6, in the application in question. Accordingly, the invention contemplates effecting the requisite write-in and read-out using a time-multiplex technique.

Figure 3:
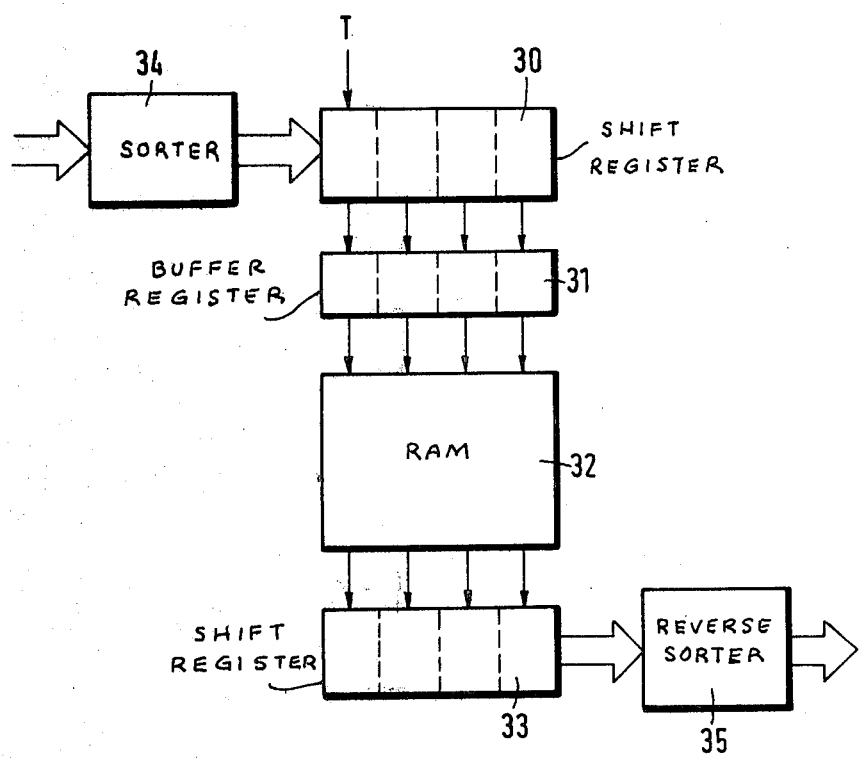
FIG. 3 is an explanatory block diagram illustrating how a multiplex technique can be utilized to reduce the write-in and read-out speeds needed for the random-access memory employed.

FIG. 3 depicts the contemplated technique. Each elementary RAM 4, 6 in FIG. 1 is to be replaced by a combination of registers and RAM, as shown. It is to be assumed that the digitalized luminance information produced at the output of analog-to-digital converter 3 of FIG. 1 is in 7-bit PCM-coded form. This 7-bit word is applied to the data input of a 4-stage shift register 30. This shift-pulse input of shift register 30 is denoted by T. Shift pulses are applied to input T to cause register 30 to serially register four successive 7-bit words, each 7-bit word containing the luminance information for one image point in one image line. These four 7-bit words are now available, in shift register 30, for parallel transmission to the next storage stage. After the serial write-in of these four 7-bit words into shift register 30, the four stages of register 30 are read out simultaneously, and the four 7-bit words transmitted in parallel to four stages of a buffer register 31. Then, the four 7-bit words stored in buffer register 31 are transmitted to a random-access memory 32, and stored in a single addressable storage location therein. Of course, such single storage location must have the capacity to store four such 7-bit words, but it is nevertheless a single storage location because it, and the four 7-bit words therein, is addressed by a single x/y address. For simplicity the x and y address-signal inputs to memory 32, and the addressing counters which are to be used therewith, are not shown. These four 7-bit words now having been written into a single storage location in memory 32, the next such four 7-bit words are written into the next single storage location in memory 32, and so forth. In this way, the speed of information transfer required for the write-in into memory 32 is cut down by a factor of 4, relative to the embodiment of FIG. 2. For the read-out of this information from memory 32, the just-described process is performed in reverse. Successive single storage locations within memory 32 are read out. When one such storage location in memory 32 is read out, the four 7-bit words stored therein are transmitted in parallel to the four stages of a shift register 33, and then read out serially from the shift register 33. Accordingly, the information-transfer speed needed for read-out of the memory 32 in FIG. 3 is likewise reduced by a factor of 4, relative to that needed for the memory of FIG. 2. While this procedure has just been explained with reference to the luminance-signal component, it is likewise contemplated for the color-information signal component.

If, as has just been assumed, the four 7-bit words of each such group represent the image content of four immediately successive image points of a single image line, then when attempting to compress an image in the way already described, problems can arise because these four words are written into and read out from memory 32 as a group, i.e., using a single address signal. Accordingly, if one attempted to effect such image compression in the FIG. 3 embodiment, by skipping during read-out every second one of the x-direction addresses which had been used for write-in, there would be horizontal image compression in some sense but in each line of the reproduced compressed image alternate groups of four image points each from the original image would be suppressed. Such reproduced compressed image would have an excessively structured appearance, and would appear "choppy".

To overcome this problem, the present invention contemplates that each such group of four 7-bit words (corresponding to four immediately successive image points of an image line) be subjected to a sorting operation, prior to being written into a single storage location in memory 32, and preferably prior to being serially written into shift register 30.

To this end, a sorter 34 is provided at the input of shift register 30. The sorter 34 comprises an eight-stage buffer register, capable of storing eight 7-bit words of the type in question, plus a logic circuit for reading out serially first the even-numbered ones of those eight words followed by the odd-numbered ones of those eight words. Thus, the sorter 34 receives serially the eight 7-bit words corresponding, for example, to the first eight image points in an image line, i.e., image points #1 through #8. However, these eight stored words are then read out from sorter 34, and written into shift register 30, in the order #2, #4, #6, #8, #1, #3, #5, #7, i.e., first the even-numbered words and then the odd-numbered words. (Of course, the odd-numbered words could be read out ahead of the even-numbered words, as an alternative.) Accordingly, each single four-word storage location in memory 32 will either contain only even-numbered words or only odd-numbered words; specifically, successive single storage locations in memory 32 store four even-numbered words, the next four odd-numbered words, the next four even-numbered words, and so forth. Now, if the address sequence used for the read-out of memory 32 is the same as the address sequence used for write-in but with every second address skipped, the reproduced image will be horizontally compressed in the desired way. I.e., each image line of the reproduced horizontally compressed image will be made up of only even-numbered image points of the original image (or alternatively made up of only odd-numbered image points).

If the image-point words have been thusly sorted before being written into memory 32, and if it is desired to perform a non-compressed read-out of the T.V. image stored in memory 32, the signals read out from shift register 33 are applied to a reverse sorter 35, which restores each group of eight 7-bit words to its original order. Preferably, the sorter 34 is permanently connected to the input of shift register 30, so that the image-point words always will be thusly sorted, whereas the reverse sorter 35 is switched into the output transmission path from shift-register 33 only when the image stored in memory 32 is to be read out in non-compressed form.

It has been explained above that the sorter 34, and likewise the reverse sorter 35, is an eight-stage unit, for rearranging the order of eight 7-bit words. In order that introduction of the sorter 34 not reduce the rate of information transfer by a factor of 2, the sorter 34 can be of double or twin configuration, i.e., comprised of two such eight-stage units. In this way, while the reordered read-out of one series of eight words from the first such eight-stage unit is being performed, the second eight-stage unit can be receiving the next series of eight words. Then, when the reordered read-out of the first eight-stage unit is completed, the reordered read-out of the second eight-stage unit can immediately follow, during which the first eight-stage unit can be receiving the third series of eight words, etc. The same comments apply to the reverse sorter 35.

The storage capacities of the digital memories 4 and 6 are such that a field or frame can be stored. To store four different T.V. images in such a field or frame memory, each such T.V. image is to be compressed in both horizontal and vertical direction during its write-in into the image memory. For example: of the first image, only its even-numbered image-point words are written into the memory, utilizing only the even-numbered lines of the memory; of the second image, only its odd-numbered image-point words are written into the memory, utilizing only the even-numbered lines of the memory; of the third image, only its even-numbered image-point words are written into the memory, utilizing only the odd-numbered lines of the memory; and of the fourth image, only its odd-numbered image-point words are written into the memory, utilizing only the odd-numbered lines of the memory.

For the case of vertical compression, certain difficulties can arise with respect to color information, if the successive lines of memory 6 alternately store the color-difference sum $(U+V)$ and the color-difference $(U-V)$, i.e., $U+V$ in one memory line, $U-V$ in the next memory line, $U+V$ in the subsequent memory line, etc. If vertical compression is achieved by using during memory read-out the same address sequence used for write-in, but with every second address in this sequence skipped, then only the color-difference sum $(U+V)$ information will be read out, or else only the color-difference difference $(U-V)$ information will be read out. This would make it impossible then to recover the actual color-difference signals U and V.

To deal with this problem, the invention contemplates using an altered addressing sequence for the addressing of the lines of color-information memory 6, such that both lines in each pair of adjoining memory lines store either a color-difference sum or else a color-difference difference. Thus, if during four successive imageline intervals the color-information memory 6 receives, in order, the sum $U+V$, then the difference $U-V$, then the sum $U+V$, and then the difference $U-V$, these four sets of data, in the order received, are successively written into memory line a, memory line c, memory line b, and memory line d, respectively. Thus, the adjoining memory lines a and b will both store $U+V$ data, whereas adjoining memory lines c and d will both store $U-V$ data. If now vertical image compression is performed by reading out only the even-numbered lines (b, d, f, h, etc.), or else only the odd-numbered lines (a, c, e, g, etc.), the memory lines actually read out will alternate as between $U+V$ and $U-V$ data, in the desired way, making it possible to recover, for reproduction of the vertically compressed image, the needed color-difference signals U and V. Of course, here again, i.e., where vertical compression is to be performed, it will be seen that the address sequence used for readout differs from that used for write-in. If it is not desired to vertically compress the thusly stored image information in color-information memory 6, then the address sequence used for read-out should, here again, be the same as that used for write-in, in which case the $U+V$ and $U-V$ will alternate as between successive imageline intervals of the uncompressed image being read out. Of course, this technique is applicable not only when the alternation is as between U+V and U−V, but instead as between simple color-difference signals U and V.

It will be appreciated that the special effects described above are merely representative, and set forth to elucidate basic concepts of the invention. A great variety of special effects, of as great complexity as might be desired, will suggest themselves from the foregoing.

It will be understood that each of the elements described above, or two or more together, may also find a useful application in other types of procedures differing from the types described above.

While the invention has been illustrated, and described as embodied in certain specific image-data compression and reordering techniques, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method for the processing of color-T.V. signals, comprising the steps of separating a complete analog color-T.V. signal representing a T.V. image into its luminance signal component and its color signal component; converting each of the signal components from analog to digital form; writing each of the digitalized components into a random-access memory using during the write-in a predetermined address sequence, including the step of writing the color signal component into such random-access memory in the form of two sequential signals; reading each of the thusly stored digitalized components out from such random-access memory using during the read-out an address sequence different from the address sequence used during the write-in; converting the read out digitalized components back to analog form, and combining them to form a complete analog color-T.V. signal.

2. The method defined in claim 1, the two sequential signals respectively being the sum of two color-difference signals and the difference between such two color-difference signals.

3. A method for the processing of color-T.V. signals, comprising the steps of separating a complete analog color-T.V. signal representing a T.V. image into its luminance signal component and its color signal component; converting each of the signal components from analog to digital form; writing each of the digitalized components into a random-access memory using during the write-in a predetermined address sequence; reading each of the thusly stored digitalized components out from such random-access memory using during the read-out an address sequence different from the address sequence used during the write-in, the random-access memory being a memory comprised of addressable storage locations arranged in rows and columns, the image content of individual lines of the image being stored in different rows of the memory, the read-out of the memory being performed using row and column addressing counters, the read-out of the memory furthermore comprising changing the direction in which at least one of the addressing counters count when such addressing counter has reached a predetermined count and completing the read-out of the memory with such addressing counter now counting in the opposite direction, so that the read out information will correspond to a part of the image represented by the original color-T.V. signal plus a mirror-reflected version thereof; converting the read out digitalized components back to analog form, and combining them to form a complete analog color-T.V. signal.

4. The method defined in claim 3, writing the color signal component into such random-access memory in the form of two simultaneous signals.

5. The method defined in claim 4, the two simultaneous signals being two color-difference signals.

6. The method defined in claim 3, varying the value of said predetermined count to thereby vary the symmetry reference of the image corresponding to the data read out from the memory.

7. A method for the processing of color-T.V. signals, comprising the steps of separating a complete analog color-T.V. signal representing a T.V. image into its luminance signal component and its color signal component; converting each of the signal components from analog to digital form; writing each of the digitalized components into a random-access memory using during the write-in a predetermined address sequence, the random-access memory being a memory comprised of individually addressable storage locations, the digitalized components each comprising a series of image-point words, each image-point word corresponding to one image point of an image line of the T.V. image, the write-in into the random-access memory comprising addressing successive storage locations of the memory in a predetermined sequence, the write-in furthermore comprising subdividing the series of image-point words into successive groups of words, each such word group representing a plurality of such image points, and writing each such word group into a respective single one of the individually addressable storage locations of the memory, whereby the rate at which the address applied to the memory need change to effect the write-in is lower than the rate at which image-point words are being written into the memory; reading each of the thusly stored digitalized components out from such random-access memory using during the read-out an address sequence different from the address sequence used during the write-in; converting the read out digitalized components back to analog form, and combining them to form a complete analog color-T.V. signal.

8. The method defined in claim 7, such random-access memory comprising storage locations addressable by sequences of x and y address signals, the read-out of the random-access memory being performed by reading out only every second y-direction column of the memory, so that the read out image data corresponds to a horizontally compressed version of the image represented by the original color-T.V. signal.

9. The method defined in claim 7, such random-access memory comprising storage locations addressable by sequences of x and y address signals, the read-out of the random-access memory being performed by reading out only every second x-direction line of the memory, so that the read out image data corresponds to a vertically compressed version of the image represented by the original color-T.V. signal.

10. The method defined in claim 7, such random-access memory comprising storage locations addressable by sequences of x and y address signals, the read-out of the random-access memory being performed by reading out only every second x-direction line of the memory and within each such line only every second storage location of that line, so that the read out image data corresponds to a both vertically and horizontally compressed version of the image represented by the original color-T.V. signal.

11. The method defined in claim 7, each such group of image-point words consisting of odd-numbered image-point words alternating with even-numbered image point words in correspondence to the alternation between odd- and even-numbered image points of a line of the original T.V. image; the method furthermore comprising, before writing the image-point word groups into the memory, changing the order of image-point words such that each image-point word group as actually written into the memory consists only of even-numbered image-point words or only of odd-numbered image-point words.

12. The method defined in claim 11, the read-out of the memory comprising reading out from the memory all of the image-point words groups which consist of even-numbered image-point words before reading out image-point word groups which consists of odd-numbered image-point words, or vice versa.

13. The method defined in claim 7, the storage locations of the memory being arranged in rows corresponding to the image lines of T.V. images, the read-out of the memory comprising reading out from the memory image-point word groups in all even-numbered rows before reading out image-point word groups from odd-numbered rows, or vice versa.

14. A method for the processing of color-T.V. signals, comprising the steps of separating a complete analog color-T.V. signal representing a T.V. image into its luminance signal component and its color signal component; converting each of the signal components from analog to digital form; writing each of the digitalized components into a random-access memory using during the write-in a predetermined address sequence, the random-access memory comprising storage locations arranged in rows and columns, the rows consisting of odd-numbered rows alternating with even-numbered rows, the columns consisting of odd-numbered columns alternating with even-numbered columns, the method including sequentially writing into such random-access memory the digitalized signal components of four T.V. signals each representing a respective T.V. image and storing the information concerning all four images simultaneously, each such image consisting of odd-numbered image lines alternating with even-numbered image lines, and each such image line consisting of odd-numbered image points alternating with even-numbered image points, this comprising writing the data concerning only the even-numbered image points of the first image into the memory in the even-numbered lines of the memory, writing the data concerning only the odd-numbered image points of the second image into memory in the even-numbered lines of the memory, writing the data concerning only the even-numbered image points of the third image into the memory in the odd-numbered lines of the memory, and writing the data concerning only the odd-numbered image points of the fourth image into the memory in the odd-numbered lines of the memory; reading each of the thusly stored digitalized components out from such random-access memory using during the read-out an address sequence different from the address sequence used during the write-in; converting the read out digitalized components back to analog form, and combining them to form a complete analog color-T.V. signal.

15. A method for the processing of color-T.V. signals, comprising the steps of separating a complete analog color-T.V. signal representing a T.V. image into its luminance signal component and its color signal component, the color signal component comprising two different signals alternating in successive horizontal line intervals; converting each of the signal components from analog to digital form; the digitalized color signal component comprising a succession of image-line data groups, each image-line data group corresponding to a T.V. image line, alternate ones of the successions of image-line data groups corresponding to the two different alternating signals; writing each of the digitalized components into a random-access memory using during the write-in a predetermined address sequence; the writing of the digitalized color signal component into the random-access memory consisting writing the alternate successions of image-line data groups into storage-location rows such that the odd-numbered pairs of directly adjoining storage-location rows store successions corresponding to one of the two alternating signals whereas the even-numbered pairs of directly adjoining storage-location rows store successions corresponding to the other of the two alternating signals; reading each of the thusly stored digitalized components out from such random-access memory using during the read-out an address sequence different from the address sequence used during the write-in; converting the read out digitalized components back to analog form, and combining them to form a complete analog color-T.V. signal.

16. The method defined in claim 15; the reading out of the stored digitalized color signal component comprising reading out every second one of the storage-locations rows of the memory.

17. The method defined in claim 15, reading out the storage-location rows of the memory in an order such that the successions of image-line data groups alternate in the same way as they did prior to being written into the memory.

* * * * *